(12) United States Patent
Massey et al.

(10) Patent No.: US 6,828,760 B2
(45) Date of Patent: Dec. 7, 2004

(54) ELECTRONIC DEVICE THAT ADJUSTS OPERATION TO ACCORD WITH AVAILABLE POWER

(75) Inventors: Paul G Massey, Cupertino, CA (US); James F Bausch, Salem, OR (US); Michael D Long, Corvallis, OR (US); Chadwick W Stryker, Albany, OR (US); Steven L Fogle, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 67 days.

(21) Appl. No.: 10/277,658

(22) Filed: Oct. 22, 2002

(65) Prior Publication Data

US 2004/0075419 A1 Apr. 22, 2004

(51) Int. Cl.$^7$ .................. H01M 10/44; H01M 10/46
(52) U.S. Cl. ......................................... 320/127
(58) Field of Search ...................... 320/127, 128, 320/138; 713/300, 310, 320

(56) References Cited

U.S. PATENT DOCUMENTS 5,754,436 A * 5/1998 Walsh et al. ............... 713/300

6,369,462 B1 * 4/2002 Siri .............................. 307/51
2003/0126474 A1 * 7/2003 Sawyers et al. ............ 713/300
2004/0051498 A1 * 3/2004 Kim ............................ 320/103

OTHER PUBLICATIONS http://program.intel.com/shared/products/processors/mobile/; Intel Mobile Product Line Overview; "Boxed Mobile Intel Processors"; Sep. 30, 2002; 2 pages.

http://www.maxprogramming.com/window s/storv.asp?new sid= 236; "Windows XP Patch: AMD Pow er Now Availability in XP; MPN Access"; Sep. 30, 2002/ 2 pages.

"AMD PowerNow !"; 2002 Advanced Micro Devices, Inc.; 3 pages.

* cited by examiner

Primary Examiner—Edward H. Tso
(74) Attorney, Agent, or Firm—Jeff D Limon

(57) ABSTRACT

In an electronic device, a method for adjusting the power consumption of the electronic device includes the steps of presenting a power adapter that supplies power to the electronic device. The method continues with the electronic device sensing an attribute of power adapter, and modifying an aspect of the operation of the electronic device in response to the sensing step.

23 Claims, 3 Drawing Sheets

ELECTRONIC DEVICE THAT ADJUSTS OPERATION TO ACCORD WITH AVAILABLE POWER

BACKGROUND OF THE INVENTION

Many portable electronic devices, such as laptop computers, personal digital assistants, cellular communications devices, and portable game or entertainment devices, can be powered by way of an internal battery as well as by way of an alternating current source through a suitable power adapter. The power adapter may convert 110 or 220 volts alternating current (VAC) to a lower voltage direct current (DC) signal that can be used by the electronic device. In some cases, the power adapter may accept a direct current input from an automobile or an aircraft power source in order to provide power to operate the electronic device.

When the electronic device is a portable computing device such as a laptop computer, for example, the laptop computer may require an amount of power that is beyond the capability of a particular power adapter. Thus, for example, a user may be operating a laptop computer that consumes 75 watts, while an associated power adapter is only capable of sourcing 55 watts of power. This scenario can be brought about by the user operating the laptop computer using a power adapter that may not have been specifically intended for use with the particular model of laptop computer which the user is attempting to operate. In another instance, the user may be attempting to operate the laptop computer on an airplane, in which the airplane power adapter is a general-purpose direct current source that is limited in the amount of power that can be output from the adapter. In either case, it is generally undesirable to operate the laptop computer using a power adapter that is not capable of providing adequate power.

In the event that the user attempts to operate an electronic device using a power adapter that is not capable of providing adequate power, the electronic device may operate unpredictably or not at all. Further, the power adapter may be permanently damaged or operate at an unacceptably high temperature. In some cases, such as when using a DC power adapter on an airplane, the DC power adapter may include circuitry that interrupts the operation of the supply in the event that the supply current exceeds a rated value. In this case, the user would be required to operate the device without the assistance of DC current supplied by the aircraft.

DESCRIPTION OF THE EMBODIMENTS

Figure 1:
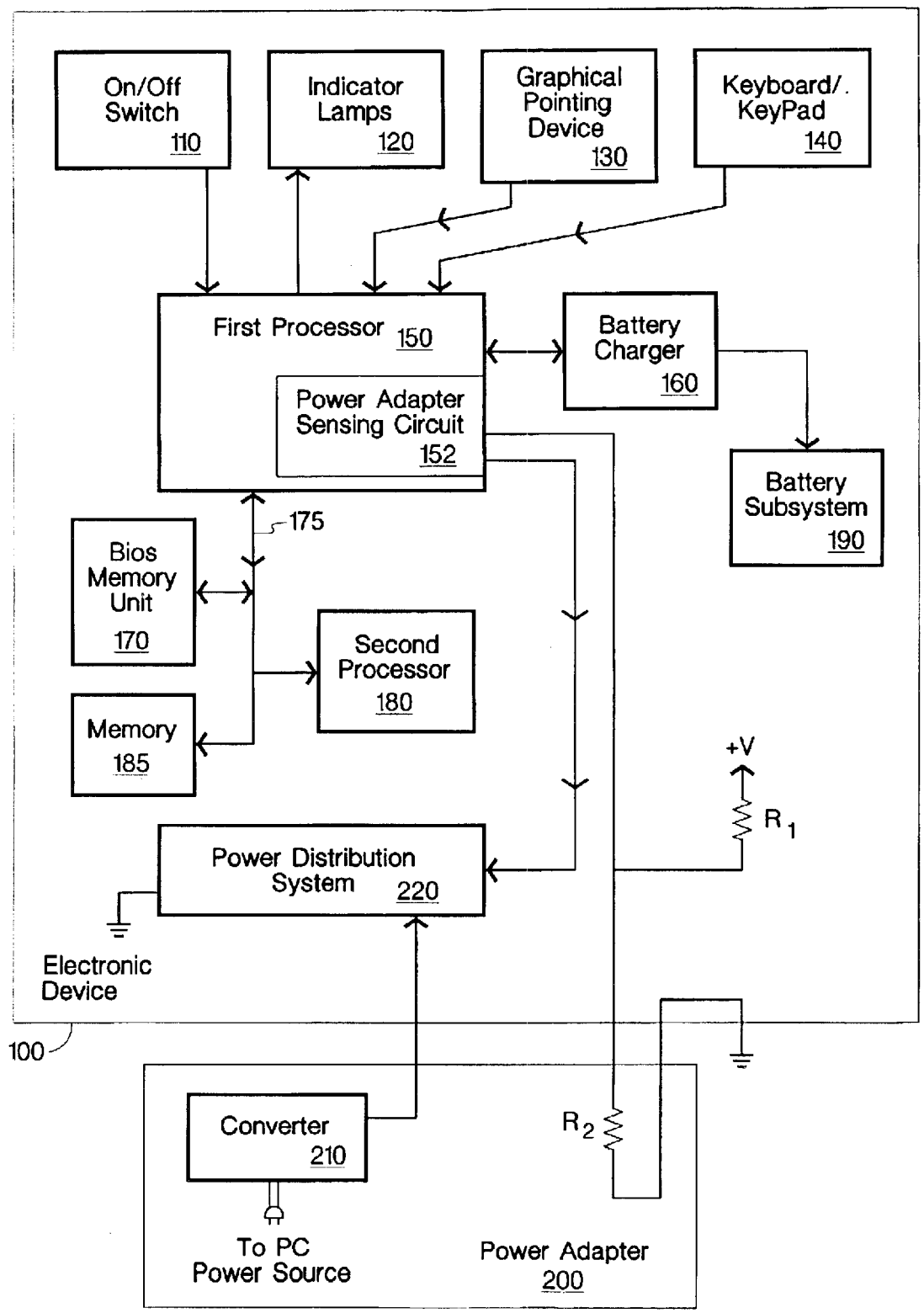
FIG. 1 is a block diagram of an electronic device that adjusts operation to accord with available power in accordance with an embodiment of the invention.

FIG. 1 is a block diagram of an electronic device that adjusts operation to accord with available power in accordance with an embodiment of the invention. In FIG. 1, electronic device 100 includes first processor 150, which receives inputs from on/off switch 110, graphical pointing device 130, as well as keyboard/keypad 140. Graphical pointing devices 130 may represent a mouse, touchpad, trackpad, or other device that can be manipulated by a user to control the placement of a cursor on a display (not shown) of electronic device 100. Keyboard/keypad 140 may represent the keyboard and/or the keypad of a portable computing unit. In the event that electronic device 100 represents a handheld game or other entertainment device, keyboard/keypad 140 can represent input device that the user controls to operate the device.

First processor 150 also includes outputs that are conveyed to indicator lamps 120, which indicate the operational status of electronic device 100. These outputs can include indications as to whether data is being read from or written to an internal disk. In the event that electronic device 100 represents a portable computing device, first processor 150 performs many of the functions performed by the keyboard controller or other embedded controller used in many such computing devices available today.

First processor 150 also includes an interface to battery charger 160 in order to control the battery charger and to monitor the health and status of the charger as well as any logic units and chemical energy storage devices that comprise battery subsystem 190. Additionally, first processor 150 includes an interface to Basic Input/Output System (BIOS) memory unit 170 and second processor 180 through system bus 175. Second processor 180 also includes an interface to memory 185 by way of system bus 175 so that operating system programs, graphical user interface programs, and other software can be performed by second processor 180 under the control of a user of electronic device 100. In the embodiment of FIG. 1, second processor 180 corresponds to a central processing unit (CPU) that represents a major consumer of power within electronic device 100.

As shown in FIG. 1, electronic device 100 includes an interface to power adapter 200. Power adapter 200 includes converter 210, which receives an AC power signal from an external power source and converts the incoming AC power to a DC output signal. In an alternate embodiment, converter 210 receives a DC power signal from a source such as an automobile battery, or a DC power source accessible by passengers traveling on an airplane. Power distribution subsystem 220 receives the direct current from power adapter 200 and distributes this power to the various subsystems and components that comprise electronic device 100. For purposes of simplicity, the interfaces from power distribution subsystem to the various subsystems and components that comprise electronic device 100 are not shown.

In the embodiment of FIG. 1, resistor R2 is used by power adapter sensing circuit 152 to determine the output capacity of power adapter 200. Thus, if power adapter 200 is capable of providing 90 watts of direct current power, for example, resistor R2 can possess a value that identifies this capability to power adapter sensing circuit 152. When power adapter sensing circuit 152 determines the value of resistor R2, first processor 150 can make use of a file or lookup table to determine the output capacity of power adapter 200. In the embodiment of FIG. 1, a unique value of the resistance R2 denotes a particular output capacity of power adapter 200. Table 1, shows a candidate matrix of the values of R2 and the corresponding output capacities of power adapter 200 for each attribute (resistance) listed.

TABLE 1

| Resistor Value (Kilo Ohm) | Power Adapter Output (Watts) | Second Processor (CPU) Speed | Display Brightness | Battery Charger State |
|---|---|---|---|---|
| 68 | 90 | Hi | Hi | On |
| 51 | 75 | Medium | Hi | On |
| 39 | 60 | Medium | Low | On |
| 30 | 55 | Medium | Low | Off |
| 5.5 | 12 | Processor off | Display off | On |

From Table 1 above, if power adapter 200 is capable of providing 90 watts of direct current power, resistor R2 possess a value of 68 Kilo Ohm. Other values of R2 may be used to identify different output capacities of power adapters to power adapter sensing circuit 152. These values can be determined through the use of a pull-up resistor, R1, which divides voltage V+ among resistors R1 and R2. Through the use of the pull-up resistor, power adapter sensing circuit 152 need only possess an analog input that is capable of measuring the voltage present.

Although power adapter sensing circuit 152 measures the resistance R2 across two conductors of the power adapter in order to determine the capacity of the adapter, another attribute or other detectable identifier that conveys an indication of the output capacity of power adapter 200 can be used. Thus, in other embodiments, power adapter 200 may include an analog voltage output that uniquely identifies the power adapter capacity to power adapter sensing circuit 152. Alternatively, power adapter 200 may include a logic output that identifies the power adapter capacity to a power adapter sensing circuit that includes the capability to process the logic output from power adapter 200, or may make use of any other detectable indicator that identifies the power adapter's output capacity.

In the embodiment of FIG. 1 and in accordance with Table 1, the determination that the power output of a particular adapter is below an optimum value can still result in the safe and reliable operation of electronic device 100, but perhaps only in a degraded mode. Thus, in the event that electronic device 100 requires 90 watts to operate under nominal circumstances, operation of the device at 55 watts is still permissible. Under these circumstances, first processor 150 of electronic device 100 may identify an aspect of the electronic device (such as one or more of second processor 180 clock speed, display brightness, and battery charger state) that is to be adjusted to accord with the capacity of the power adapter.

As shown in Table 1, first processor 150 may reduce the speed of second processor (180) that controls the operation of the electronic device, reduce the brightness of the display device that presents information to the user of electronic device 100, or modify the operation of battery charger 160 to deliver more or less current to the battery. First processor 150 may also modify the operation of peripheral optical and magnetic disk drives and may also modify the operation of internal optical or magnetic disk drives, provided that the modification does not unacceptably degrade basic operations of the electronic device. First processor 150 may also perform other modifications to the operation of electronic device 100 so that the power consumption of the device can be reduced to a level within the limit of the output capacity of power adapter 200.

It should be pointed out that the second processor speed setting, display brightness setting, and battery charger state of Table 1 are merely examples of aspects of a candidate electronic device. Thus, some embodiments of the invention may include other aspects such as the status of internal of external disk drives, as previously mentioned. Further, in some embodiments, the various aspects may be tradable. For example, when operating the electronic device from a 75-watt power adapter, the user may be presented with the choice of operating the CPU (or second processor) at a high speed with the battery charger in the Off state, or operating the CPU at a lower speed with the battery charger in the On state.

Figure 2:
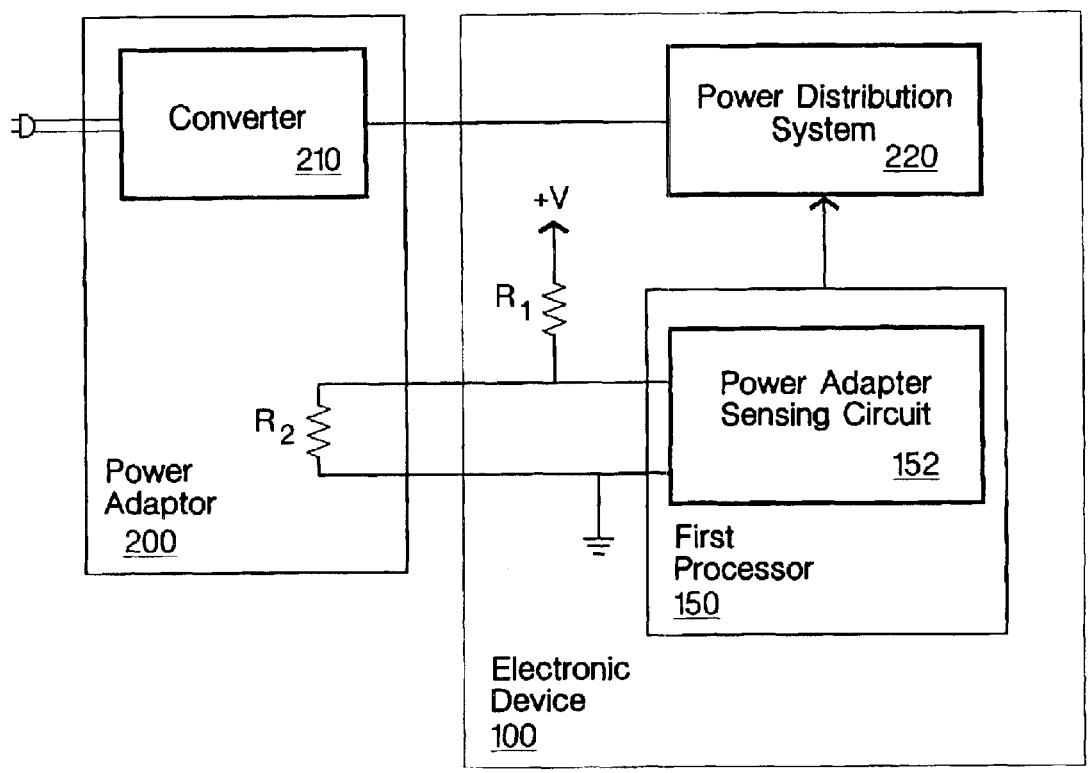
FIG. 2 is a simplified view of a power capability sensing subsystem for use in an electronic device that adjusts operation to accord with available power in accordance with an embodiment of the invention.

FIG. 2 is a simplified view of a power capability sensing subsystem for use in an electronic device that adjusts operation to accord with available power in accordance with an embodiment of the invention. In FIG. 2, voltage source +V provides a voltage that is divided by the combination of resistors R1 and R2. The value of the voltage across resistor R2 is determined by power adapter sensing circuit 152. As a result of the sensing of the resistance R2, power distribution subsystem 220, acting under the control of either or both of first processor 150 and second processor 180, can reduce or eliminate the power conveyed to the various subsystems and components of electronic device 100.

In an alternate embodiment, resistor R2 may be embedded in a cable that connects power adapter 200 with electronic device 100. Thus, in the event that the power adapter is capable or providing, for example, 90 watts of power to device 100, resistor R2 may correspond to an adapter having a capacity of only 60 watts. This allows the user to limit the power consumed by device 100 simply by using a different power cable between power adapter 200 and device 100.

Figure 3:
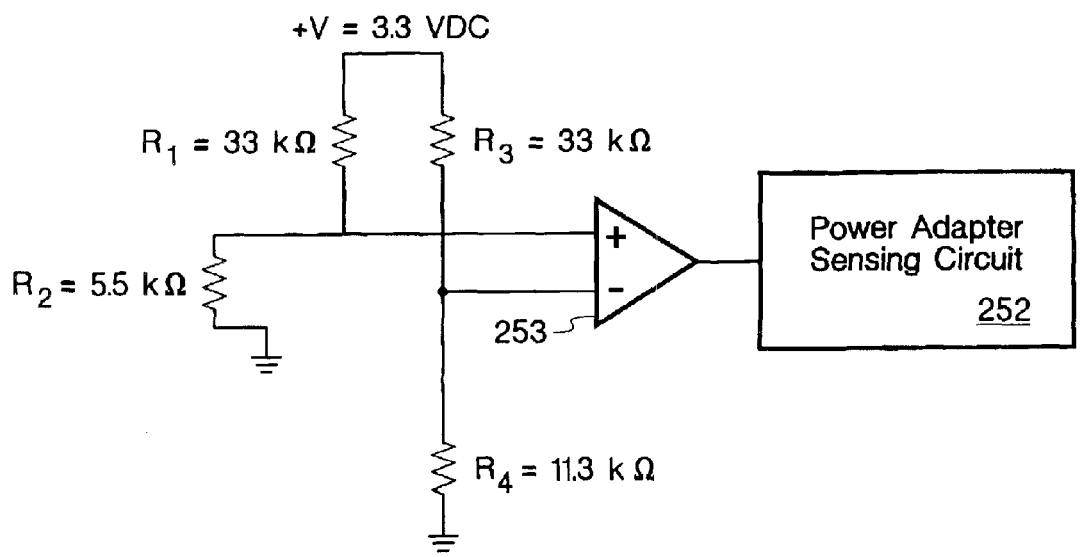
FIG. 3 is a power capability sensing subsystem that includes sample resistor values for use in an electronic device that adjusts operation to accord with available power in accordance with another embodiment of the invention.

FIG. 3 is a power capability sensing subsystem using candidate resistor values for use in an electronic device that adjusts operation to accord with available power in accordance with another embodiment of the invention. In FIG. 3, resistor R2 (12 Kilo Ohm) is used to divide a 3.3 VDC source. The divided voltage from the 3.3 VDC source is input to the high (+) side of comparator 253. Resistor R2 corresponds to the resistance present within a power adapter, such as is power adapter 200 of FIGS. 1 and 2. Resistor R3 and R4 are used to divide down the 3.3 VDC inputs and present a fixed voltage to the low (−) side of comparator 253. The output of the comparator is then input to power adapter sensing circuit 252. For the resistor values shown in FIG. 3, the voltage present at the inverting (−) input of comparator 253 is (3.3)(11.3)/(33+11.3)=0.84 Volts.

Power adapter sensing circuit 252 performs a function similar to power adapter sensing circuit 152 of FIGS. 1 and 2, with the exception that the comparator circuit shown in FIG. 3 does not require that the sensing circuit possess an analog input. The circuit of FIG. 3 only requires power adapter sensing circuit 252 to possess a discrete input, such as a logic high/low input. Thus, when R2 drops below a particular value, in this case equal to 12 Kilo Ohms, comparator 253 switches to a logic low output since (3.3)(5.5)/(33+5.5)=0.47 Volts. This change informs power adapter sensing circuit 252 that the value of the signature resistance is too low to be used by electronic device 100. This allows the electronic device to refrain from switching to an adapter that does not possess sufficient power outputs to operate the device in even a degraded performance mode. However, a power adapter having this capacity may still be useful in operating battery charger 160 of FIG. 1.

Figure 4:
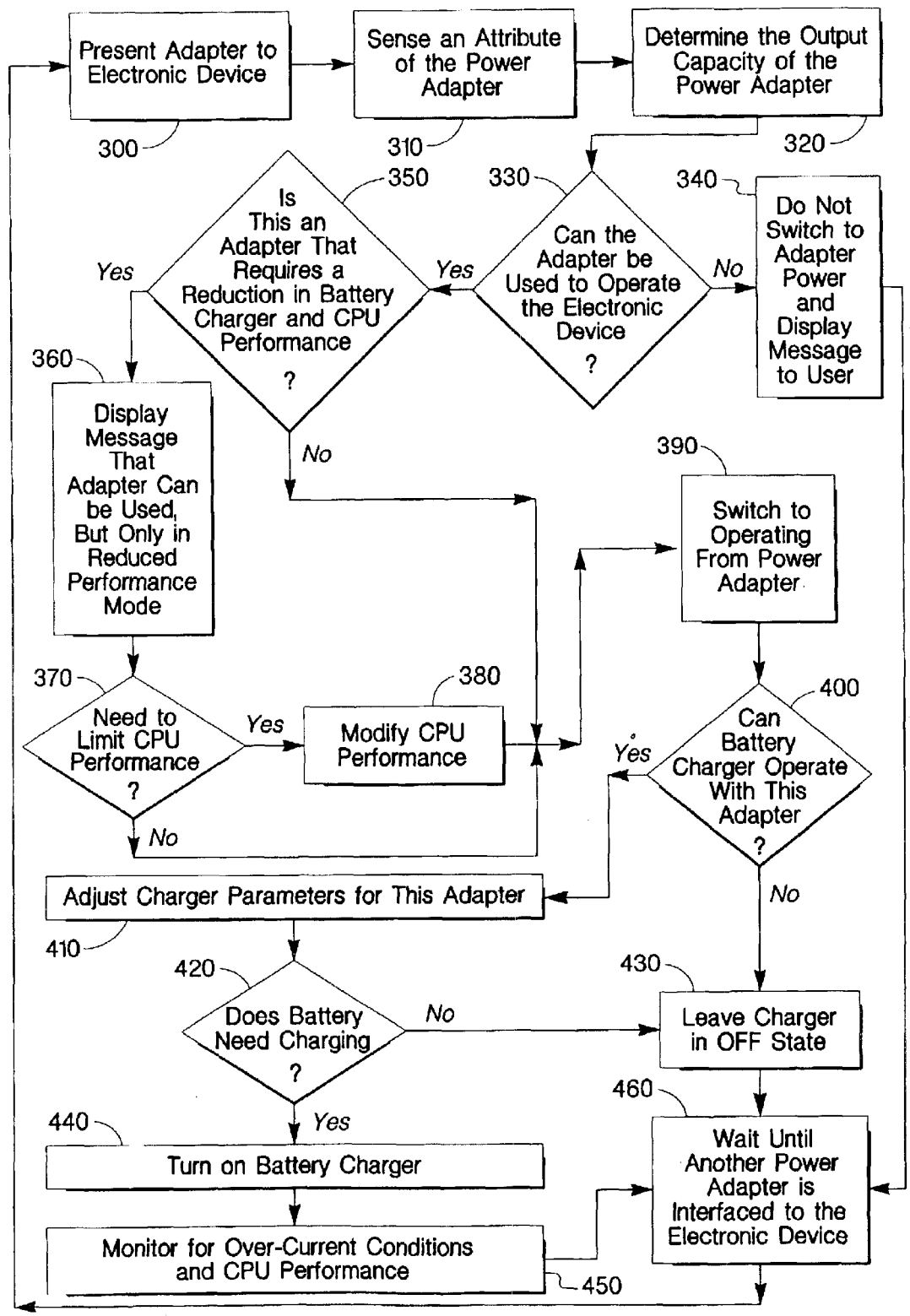
FIG. 4 is a flowchart for a method used in an electronic device that adjusts operation to accord with available power in accordance with an embodiment of the invention.

FIG. 4 is a flowchart for a method used in an electronic device that adjusts operation to accord with available power in accordance with an embodiment of the invention. The electronic device and power adapter of FIG. 1 may be suitable for performing the method of FIG. 4. The method begins at step 300, in which a power adapter is presented to an electronic device. Step 300 may include a user interfacing a cable from the power adapter to the device. The method continues at step 310 in which the electronic device senses an attribute of the power adapter. This attribute may be a resistance that is measured between two or more conductors of a cable that interfaces the power adapter to the electronic device, an analog voltage from the power adapter, an output from a logic unit within the power adapter, or other detectable indicator that conveys an indication of the power adapter's output capacity.

At step 320, the electronic device determines the output capacity of the power adapter. Step 320 can be performed by way of a power adapter sensing circuit that determines the value of a resistance present between two conductors of a cable that interfaces the power adapter with the electronic device. The method continues at step 330 in which the electronic device determines if the value of the resistance determined in step 320 corresponds to a power adapter having a minimum output capacity sufficient to operate the electronic device. In the event that the power adapter does not have sufficient output capacity to operate the electronic device, step 340 is performed in which the electronic device does not switch to receive power from the power adapter. Additionally in step 340, a message is displayed to the user indicating that the power adapter cannot be used with the electronic device. The method then skips to step 460 in which the electronic device waits until another power adapter is interfaced to the device. While step 460 is being performed, the user may interact with the electronic device in the normal manner, with the device being powered by an internal battery.

In the event that step 330 indicates that the adapter can be used to support the electronic device, step 350 is performed in which the electronic device determines if the adapter requires a reduction in battery charging and central processing unit performance. In the event that the electronic device can operate but only with the battery charger in an "off" state, with the CPU in a reduced-performance mode, or in a manner that requires another aspect of the electronic device be operated in a reduced-performance mode, step 360 is performed. In step 360, a message is displayed to the user indicating that the particular power adapter can be used with the electronic device, but that at least one aspect of the operation of the electronic device has been affected. In one embodiment, the information presented to the user in step 360 may include as little as a simple text message indicating the need to modify an aspect of the electronic devices operation. In another embodiment, the information presented to the user includes a menu of available options that could be deactivated in order to reduce device power consumption. The information presented to the user in step 360 can also include a real-time calculation of the current power consumption based on a list of components and the operating parameters for each. This information may include items such as the processor clock speed setting (in MHz), the display brightness setting, and so forth. These selections can allow the user to optimize the operation of the electronic device based on the user's preferences and the power available to the device.

In step 370, a decision is made as to whether the electronic device needs to limit the CPU performance in order to reduce the power consumption to a level commensurate with the output capacity of the power adapter. In the event that the CPU performance does need to be modified, step 380 is performed in which the electronic device reduces the performance of the CPU and proceeds to step 390. This reduction in CPU performance can be brought about by intermittently stopping the CPU clock signal using a "stop clock" or "stop grant" command used to suspend CPU operation in Intel®-based processors. Other power limiting techniques can include Intel® Speed Step™ or Advanced Micro Devices (AMD) Power Now!™ technology, which are designed to limit the power consumption of the CPU to preserve battery life. These techniques can be used in this embodiment to reduce CPU performance, thereby allowing the electronic device to manage its own CPU power consumption to accord with the power available to the electronic device.

In other embodiments of the invention, step 380 may be replaced by modifying other aspects of the operation of the electronic device, such as changing the display brightness, suspending the operation of optical or magnetic disk drives, or performing other modifications to the operation of electronic device so that the power consumption of the device can be reduced. If the decision of step 370 indicates that CPU performance does not need to be limited, step 380 is skipped and step 390 is performed in which the electronic device switches to operating from the power adapter.

Referring back to step 350, if the decision of step 350 indicates that the use of the power adapter does not require a reduction in battery charger and CPU performance, step 390 is performed in which the electronic device switches to receiving power from the power adapter. The method proceeds at step 400 in which the electronic device determines if the battery charger can be operated with the selected power adapter. If the output capacity of the power adapter is sufficient to operate the battery charger, step 410 is performed in which the electronic device adjusts the battery charger parameters, such as a battery charge rate, for the selected adapter. Step 410 may include the electronic device limiting or increasing the electric current available for use by the battery charger. If the decision of step 400 indicates that the battery charger cannot be operated using the selected power adapter, step 430 is performed in which the battery charger is left in the "Off" state. Step 430 can also be performed in response to step 420 in which the electronic device determines if the battery of the electronic device is at full capacity and thus does not require charging at this time.

If the decision of step 420 indicates that the battery of the electronic device does require charging, step 440 is performed in which the battery charger is activated. Step 450 is then performed in which the electronic device monitors the performance and adjusts the performance based on the current power consumption. Step 450 can include the dynamic increasing of the CPU performance in the event that the overall power consumption of the electronic device remains below a predetermined limit for a predetermined time. For example, in the event that the battery charger has completed charging the battery, thereby making additional power resources available for other functions within the electronic device, the power allocated to the CPU can be increased, thereby allowing the CPU to operate at increased performance. Step 460 is then performed in which the electronic device waits until another power adapter is interfaced. Step 460 represents the steady-state operation of the electronic device using the selected power adapter, or from an internal battery of the electronic device.

Although the method of FIG. 4 has been presented as including steps 300 through 460, other embodiments of the invention may include presenting a power adapter that supplies power to the electronic device (step 300), the electronic device sensing an attribute of the power adapter (step 310), and the electronic device modifying an aspect of the operation of the electronic device in response to the sensing step (step 380 and/or step 410).

Other embodiments of the invention may only include the steps of sensing an attribute of a power adapter (step 310), determining the output capacity of the power adapter from the attribute (step 320), and modifying at least one of processor power consumption (step 380) and battery charger power consumption (step 410) based on the determining step. Additionally, some or all of the method of FIG. 4 may be encoded onto a computer program product, such as a diskette, CD, or other memory media, wherein the instructions, when executed by an electronic device, cause the electronic device to perform the method.

In conclusion, while the present invention has been particularly shown and described with reference to the foregoing embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. In an electronic device, a method for adjusting the power consumption of the electronic device, comprising the steps of:

presenting a power adapter that supplies power to the electronic device through a first output of the power adapter coupled to a first input of the electronic device;

the electronic device sensing an attribute of the power adapter through a second output of the power adapter coupled to a second input of the electronic device; and the electronic device modifying an aspect of the operation of the electronic device in response to the sensing step.

2. The method of claim 1, wherein the attribute is a value of resistance measured between at least two conductors of the second output of the power adapter.

3. The method of claim 2, further comprising the step of the electronic device determining the power available to the electronic device in response to measuring the value of resistance.

4. The method of claim 1, wherein the electronic device is a portable computing device.

5. The method of claim 1, further comprising the step of displaying a message to a user of the electronic device that at least one aspect of the operation of the electronic device has been affected as a result of the sensing step.

6. In an electronic device, a method for adjusting the power consumption of the electronic device, comprising the steps of:

presenting a power adapter that supplies power through a first input of the electronic device;

the electronic device sensing an attribute of the power adapter through a second input of the electronic device; and the electronic device modifying an aspect of the operation of the electronic device in response to the sensing step, wherein the presenting step includes presenting a power cable from the power adapter to the electronic device and wherein the sensing step is performed by sensing a resistor present at a location within the power cable.

7. A method for adjusting operation of an electronic device to accord with an available power input, comprising the steps of:

sensing an attribute of a power adapter;

determining the output capacity of the power adapter from the attribute; and modifying at least one of processor power consumption and battery charge rate based on the determining step, wherein power is conveyed to the electronic device through a first input to the electronic device, and wherein the attribute of the power adapter is sensed through a second input to the electronic device.

8. The method of claim 7, wherein the attribute is a value of resistance measured between at least two conductors of a cable that interfaces the power adapter with the second input of the electronic device.

9. The method of claim 7, further comprising the step of displaying a message to a user of the electronic device that at least one aspect of the operation of the electronic device has been affected as a result of the sensing step.

10. The method of claim 9, wherein the displaying step further comprises the step of displaying a calculation of the electronic device power consumption based on a list of components and an operating parameter for each of the components.

11. The method of claim 7, wherein the sensing step includes sensing a resistor value, wherein the resistor is located in the power adapter.

12. A electronic device comprising:

a power adapter sensing circuit that determines an attribute of a power adapter; and a first processor that determines the capacity of the power adapter based on the attribute; wherein, the first processor is coupled to the power adapter sensing circuit, the first processor identifying an aspect of the electronic device that is to be adjusted to accord with the capacity of the power adapter, wherein power is conveyed to the electronic device through a first input to the electronic device, and wherein the power adapter sensing circuit determines the attribute of the power adapter through a second input to the electronic device.

13. The electronic device of claim 12, wherein the attribute is a resistance measured between two conductors of the power adapter.

14. The electronic device of claim 12, wherein the attribute is a resistance of a resistor that is embedded in a cable that couples the power adapter to the electronic device.

15. The electronic device of claim 12, wherein the aspect of the electronic device is a clock speed of a second processor coupled to the first processor.

16. The electronic device of claim 12, wherein the aspect is the On/Off state of the battery charger.

17. The electronic device of claim 12, wherein the aspect of the electronic device is a brightness of a display associated with the electronic device.

18. A power capability sensing subsystem for use in an electronic device, comprising:

a first processor that modifies the power consumption of the electronic device;

at least one of a voltage divider having an analog output to the first processor and a comparator having a discrete output; and at least one of a battery charger and a second processor that receives commands from the first processor and reduces the power consumption of the at least one of the battery charger and the second processor, wherein the first processor additionally receives inputs from one of a keyboard or keypad that operates the electronic device.

19. The power capability sensing subsystem of claim 18, wherein the first processor uses the comparator discrete output to control an on/off state of the battery charger.

20. An electronic device that adjusts operation to accord with available power, comprising:

means for sensing an attribute of a power adapter; and means for modifying at least one of a processor speed setting and a battery charger state based on the sensed attribute, wherein the means for modifying includes means for accessing a lookup table that lists an attribute value an a corresponding one of a processor speed setting and a battery charger state.

21. The electronic device of claim 20, wherein the means for sensing an attribute of a power adapter includes means for means for sensing the resistance of a resistor placed between two conductors of a cable that connects the power adapter to the electronic device.

22. The electronic device of claim 20, wherein the means for modifying includes means for intermittently stopping the clock signal to a processor of the electronic device.

23. The electronic device of claim 20, wherein the means for modifying includes means for shutting off the battery charger.

\* \* \* \* \*